May 17, 1927. 1,629,399
H. G. LORD
SPRING CONSTRUCTION
Filed Jan. 14, 1922
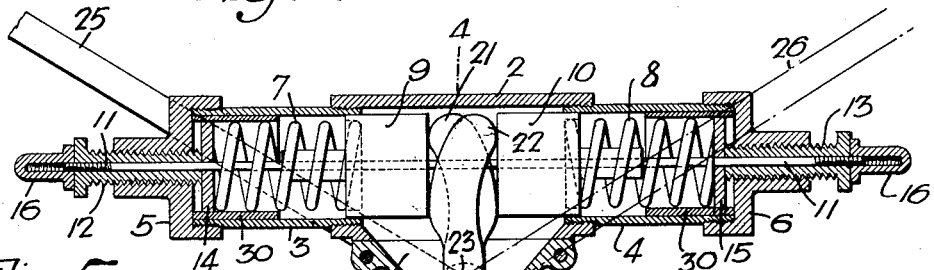
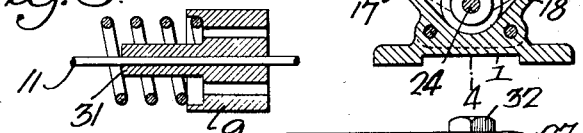
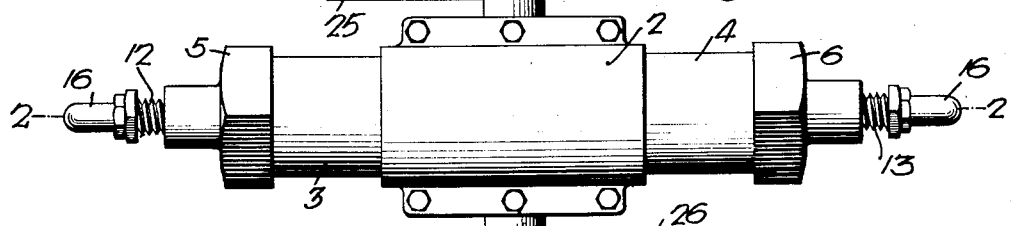
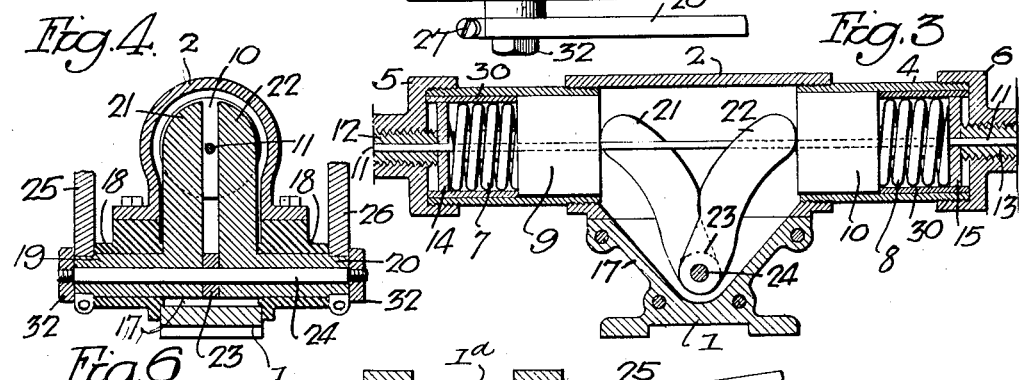
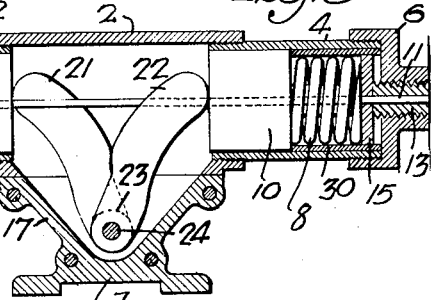
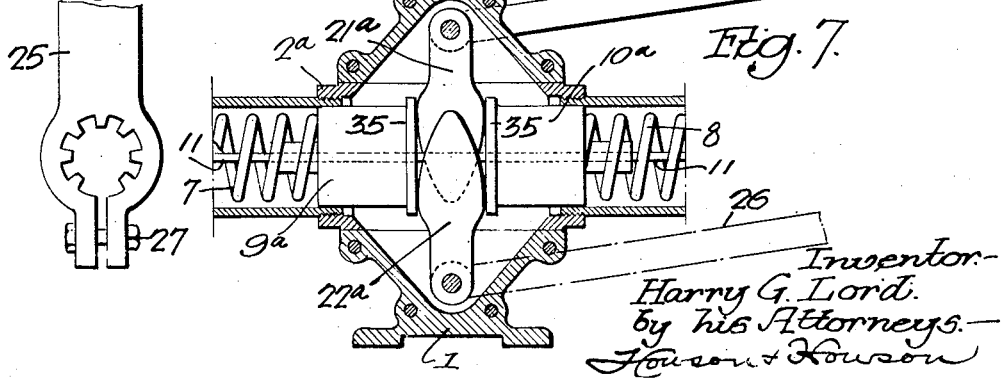
Inventor:-
Harry G. Lord.
by his Attorneys.-
Howson & Howson Patented May 17, 1927.

1,629,399

UNITED STATES PATENT OFFICE.

HARRY G. LORD, OF PHILADELPHIA, PENNSYLVANIA.

SPRING CONSTRUCTION.

Application filed January 14, 1922. Serial No. 529,107.

One object of this invention is to provide a compact, simple, substantial device employing a plurality of springs so mounted and combined with other elements as to yieldingly oppose movement of both of two members as a load is applied thereto, the invention also contemplating such an arrangement of parts as will cause said springs to also oppose movement of said members as these react or rebound upon the removal or decrease of said load.

Another object of the invention is to provide a novel combination, including a plurality of springs with a pair of load-supporting members, in which said springs are mounted to operatively coact with either member so as to oppose movement thereof on either side of a neutral position.

It is also desired to provide novel means for utilizing two springs to yieldingly oppose movement of two relatively movable load-carrying members, so that each of said springs shall be available to coact with one member when it moves in one direction and with the other member when this moves in an opposite direction; the invention further contemplating novel structures for operatively connecting the springs and load-supporting members as well as simple and durable means for supporting and adjusting the springs with their associated parts.

These objects and other advantageous ends I attain as hereinafter set forth, reference being had to the accompanying drawings, in which, Fig. 1 is a plan of one form of the device constituting my invention;

Fig. 2 is a longitudinal vertical section on the line 2—2, Fig. 1, showing the springs with their associated parts in their neutral positions;

Fig. 3 is a vertical section similar to Fig. 2, illustrating the positions occupied by the parts of the device when under load;

Fig. 4 is a transverse vertical section on the line 4—4, Fig. 2;

Fig. 5 is a fragmentary vertical section of one of the plungers and certain of its associated parts;

Fig. 6 is a fragmentary side elevation of one of the load-supporting members, showing one device for non-rotatably connecting it to its associated cam arm; and Fig. 7 is a longitudinal vertical section of the main portion of a modified form of my invention.

In the above drawings 1 represents a supporting base or frame which carries a substantially cylindrical body portion 2. This body portion may be either integral with or connected in any suitable manner to said base and may likewise be connected to or made to include tubular extensions 3 and 4, which at their outer ends are respectively provided with heads or caps 5 and 6. These extensions are axially in line with the body 2 and have mounted within them coil springs respectively indicated at 7 and 8. Mounted between these springs and engaged by their adjacent ends are two plungers 9 and 10 slidably guided within the body and its extensions and each having its face adjacent its cooperating spring recessed to form a seat therefor as indicated in Fig. 5.

For assisting in guiding and supporting said plungers, I mount axially within the body 2 and its extensions 3 and 4 a rod 11 which extends through the plungers 9 and 10 and through sleeves 12 and 13 threaded into the heads 5 and 6 respectively. These sleeves are preferably flanged or otherwise formed to receive a wrench whereby they may be turned at will and their inner ends engage pressure plates indicated at 14 and 15, respectively bearing against the outer ends of the springs 7 and 8. The rod 11 is freely slidable through these sleeves and its outer ends are threaded for the reception of locking nuts in the form of caps 16 whereby relative rotation of said sleeves is effectually prevented.

The base 1 is formed with a chamber 17 opening into the cylindrical body 2, and having side walls provided by plates 18 forming bearings for an aligned pair of spindles 19 and 20. The inner or adjacent ends of these latter have integrally or otherwise fixed to them a pair of cam arms 21 and 22 both of which project between the adjacent faces of the plungers 9 and 10 with which they are maintained in engagement by means of the springs 7 and 8. These cam arms project on opposite sides of the rod 11 and are designed to move in parallel planes having in the present instance a spacing member 23 mounted between them and carried upon a spindle 24 coaxial with their spindles 19 and 20.

The load-carrying members in the form of arms 25 and 26 are respectively fixed to the outer ends of the two spindles 19 and 20, and while the connection between these elements may be of any suitable construction formed for rigidly attaching them, I preferably form the outer end of each of said spindles with a series of teeth designed to fit into the correspondingly toothed end of one of the arms 25 or 26, as illustrated in Fig. 6, said arm being preferably split as shown in said figure and provided with a bolt 27 whereby it may be immovably clamped in place. While the load-supporting arms may be arranged in any relation desired, I have shown them in the present instance in lines at an angle to each other when the cam arms 21 and 22 are substantially parallel and in their neutral positions between the plungers 9 and 10.

When a load is applied to the arms 25 and 26, tending to cause their spindles 19 and 20 to turn in their bearings and the cam arms 21 and 22 to slidably move over the adjacent faces of the members 9 and 10 into the positions shown in Fig. 3, the latter of said arms acts upon the adjacent face of the plunger 10, causing it to slide outwardly in the extension 4 and compress the spring 8. At the same time the cam arm 21 swings in the opposite direction so that it acts on the plunger 9 and compresses the spring 7. Such compression continues until the force of the springs balances the load applied, although excessive compression of the springs is prevented by providing stops in the form of sleeves 30 abutting against the heads 5 and 6 and of such a length as to be engaged by the plungers 9 and 10 when these have been forced apart to the allowable extent.

Obviously when the load is removed from the members 25 and 26, the springs 7 and 8 act to turn the cam arms toward their neutral or parallel position shown in Fig. 2, although if the load should be removed from said arms in such a manner that these tend to move past their neutral positions shown in Fig. 2, the cam arm 22 now acts on the plunger 9 so that this rebound or reaction is opposed by the spring 7, while similarly the spring 8 acts to oppose the excessive movement of the cam arm 21 with its attached parts.

This peculiar and characteristic operation of my device is especially valuable when it is used in connection with similar devices in supporting the body or chassis of a motor vehicle from the axles thereof, since both springs of each device at all times serve to resiliently support the load and at the same time are both at all times available to act in checking or cushioning the rebound or upward movement of the body, when the members 25 and 26 or their equivalents move together past their neutral positions.

The tension of the springs 7 and 8 may be adjusted at will by screwing the sleeves 12 and 13 into or out of the heads 5 and 6 so as to vary the positions of the pressure plates 14 and 15, and after such adjustment the locking caps 16 are likewise adjusted on the rod 11 so as to prevent relative movement of said sleeves. In order to increase the length of the bearing between the plungers 9 and 10 and rod 11, each of said plungers may be formed with an axial extension 31 for this purpose. The possibility of the arms 25 and 26 working off of the ends of their sleeves 19 and 20 is effectually prevented by providing the spindle 24 with heads 32 which may be threaded to it if desired.

While as shown in Figs. 1 to 4 inclusive, the cam arms 21 and 22 are mounted coaxially, I may if desired so mount them that they project in opposite directions from their supporting spindles between the plungers. For this purpose the body of the device is constructed as indicated at 2$^a$ and it is provided with two similar projections 1 and 1$^a$ for supporting the device on an axle or other structure. In this case the arm 26 is rigidly fixed to the spindle 20, which is associated with the cam arm 22$^a$ while the member 25 is fixed to the sleeve 19 which has the cam arm 21$^a$. Said sleeve 19 is journalled in the upper one of the frame members 1$^a$ while the sleeve 20 is journalled in the lower frame member 1 so that the cam arms project toward each other and extend between the adjacent ends of the two plungers 9$^a$ and 10$^a$ which in this particular case are shown as having flanges 35 which are arranged to engage the adjacent ends of the cylindrical extensions 3 and 4 to limit the compression of the springs, for which purpose they take the place of the sleeves 30 in Figs. 1 and 3 of the drawings.

In this form of the invention as in the other illustrated, if the load to be supported is applied to the arms 25 and 26, while the frame 1 is mounted on a supporting structure, the spring 8 through the plunger 10$^a$ is compressed by the cam arm 22$^a$, while the spring 7 is likewise compressed by the cam arm 21$^a$ acting through the plunger 9$^a$. If, as in the case of the frame and chassis and axles of a motor vehicle, the supporting structure 1 alternately moves down and then rebounds as occurs by reason of unevennesses in the roadbed or the like, the springs 7 and 8 act to absorb the shocks due to such vibration and in the event of their abnormal reaction, the cam arm 22$^a$ passes its neutral point and compresses the spring 7, while the cam arm 21$^a$ likewise passes its neutral point and compresses the spring 8. Thus, as in the other form of the invention, each spring acts to support a portion of the load as applied by one of the members 25 or 26 and also to resist abnormal movement of the other of said members such as might be caused by the abnormal reaction of the other spring.

While both of the cam arms may have both edges substantially similar in outline and be so formed as to bear on their plungers with increasing leverage as they are moved from their neutral positions, as shown in Fig. 7, I may form said arms as in Figs. 2 and 3 so that the length of their effective lever arms remains substantially constant when they are moved in one direction from their neutral positions and is increased as they are moved in the opposite direction from such positions. Thus the toe of each of the cam arms carries the dead weight and the downward thrust of the load with a constant leverage, while the heel of said arm resists upward motion or rebound with a progressively increasing leverage.

From the foregoing description it will be noted that the plungers 9 and 10 possess the advantageous function of cooperating with the casings in which they are slidable to retard the action of the springs as these are compressed or expanded from any given position, by reason of their compression or exhaustion of air confined in the parts 3 and 4 of the body. This dashpot action is particularly useful in applying a retarding or cushioning force to the movement of the plungers at the time that the cam arms 21 and 22 pass each other or when each cam arm shifts from engagement with one plunger to engagement with the other.

I claim:

1. The combination of a supporting structure; two springs mounted thereon; with two load-supporting members respectively having oppositely movable portions projecting between said springs, each member being positioned to have its movement opposed by one spring only when it moves in one direction and opposed by the other spring when it moves in the opposite direction and normally held from movement thereby in either direction.

2. The combination of a supporting structure; two springs mounted thereon; two load-supporting members respectively including arms positioned between the adjacent ends of said springs and each placed to act on either spring so as not to affect the other; with adjustable means for limiting the compression of the springs under the action of said arms.

3. The combination of two springs; two plungers respectively cooperating with said springs; and two load-supporting members projecting between the plungers and mounted to both have their movement in either direction opposed by one or the other of said springs, each of said springs being adapted to be successively subjected to load and rebound conditions.

4. The combination of a supporting structure; two aligned springs mounted thereon; two spindles; load-supporting arms on said spindles respectively; and two other arms respectively fixed to the spindles and extending between the adjacent ends of said springs, each arm being positioned to have its movement opposed by one spring only when it moves in one direction and opposed by the other spring when it moves in the opposite direction.

5. The combination of a casing; two plungers guided therein; two springs mounted in the casing to act on the plungers respectively; with a pair of load-supporting arms each including a portion extending between the plungers in position to act thereon to compress one or the other of the springs only when moved from a normal position, one of said springs positioned to cooperate successively with said supporting arm portions.

6. The combination of a supporting structure; two springs mounted thereon; members acted on by the springs and mounted adjacent each other; cam arms having a varying leverage extending between said members in positions to each act on either member so as not to affect the other; and load-supporting elements respectively connected to said cam arms.

7. The combination of a supporting structure; two springs mounted thereon; members acted on by the springs and mounted adjacent each other; cam arms extending between said members; and load-supporting elements respectively connected to said cam arms, the latter being formed to exert substantially constant leverage on said members when moved in one direction.

8. The combination of a casing; two spindles journalled therein; two plungers guided in the casing; springs operative on the plungers; cam arms fixed to the spindles respectively and projecting between the plungers; with load-supporting arms connected to the spindles.

9. The combination of a supporting structure forming a housing; two load-supporting members journalled on said structure; two arms extending into said housing and respectively connected to said members and movable thereby in opposite directions when load is applied thereto; and a pair of springs positioned to oppose movement of both of said arms in either direction from a neutral position.

10. The combination of a supporting structure; two springs mounted thereon; two load-supporting members positioned to have their movement resisted by the springs both when a load is applied to them and also when they move as a result of the reaction of said load, each spring being positioned to be acted on by both of said levers; and means for operatively associating said springs and said members, respectively, said members being in frictional engagement with said means.

11. The combination of two plungers; with cams between said plungers shaped to give relatively high and constant leverage under load and initial relatively low leverage progressing to high leverage when the action is reversed by rebound of said load.

12. The combination of a supporting structure; two springs mounted thereon; two load-supporting members respectively including arms positioned between the adjacent ends of the springs; with structures serving as dash pots to retard movement of said load supporting members under predetermined conditions.

13. The combination of a casing; two plungers guided therein; two springs mounted in the casing to act on the plungers respectively; a pair of load-supporting arms each including a portion extending between the plungers in position to act thereon to compress one or the other of the springs when moved from a normal position, the plungers being formed to cooperate with the casing to act as dash pots when the load-supporting arms shift from engagement with one of the plungers to engagement with the other.

14. In combination, a supporting structure; two springs mounted thereon; two load-supporting members respectively including arms positioned between the adjacent ends of the springs; and means adapted to serve as dash pots to retard movement of said load-supporting members, said arms being so formed as to exert a varying leverage under predetermined operating conditions.

15. The combination with two plungers; of relatively movable cams positioned therebetween, said cams being so formed as to exert a varying leverage under predetermined operating conditions, said cams being in sliding contact with said plungers.

HARRY G. LORD.